United States Patent Office 3,496,293
Patented Feb. 17, 1970

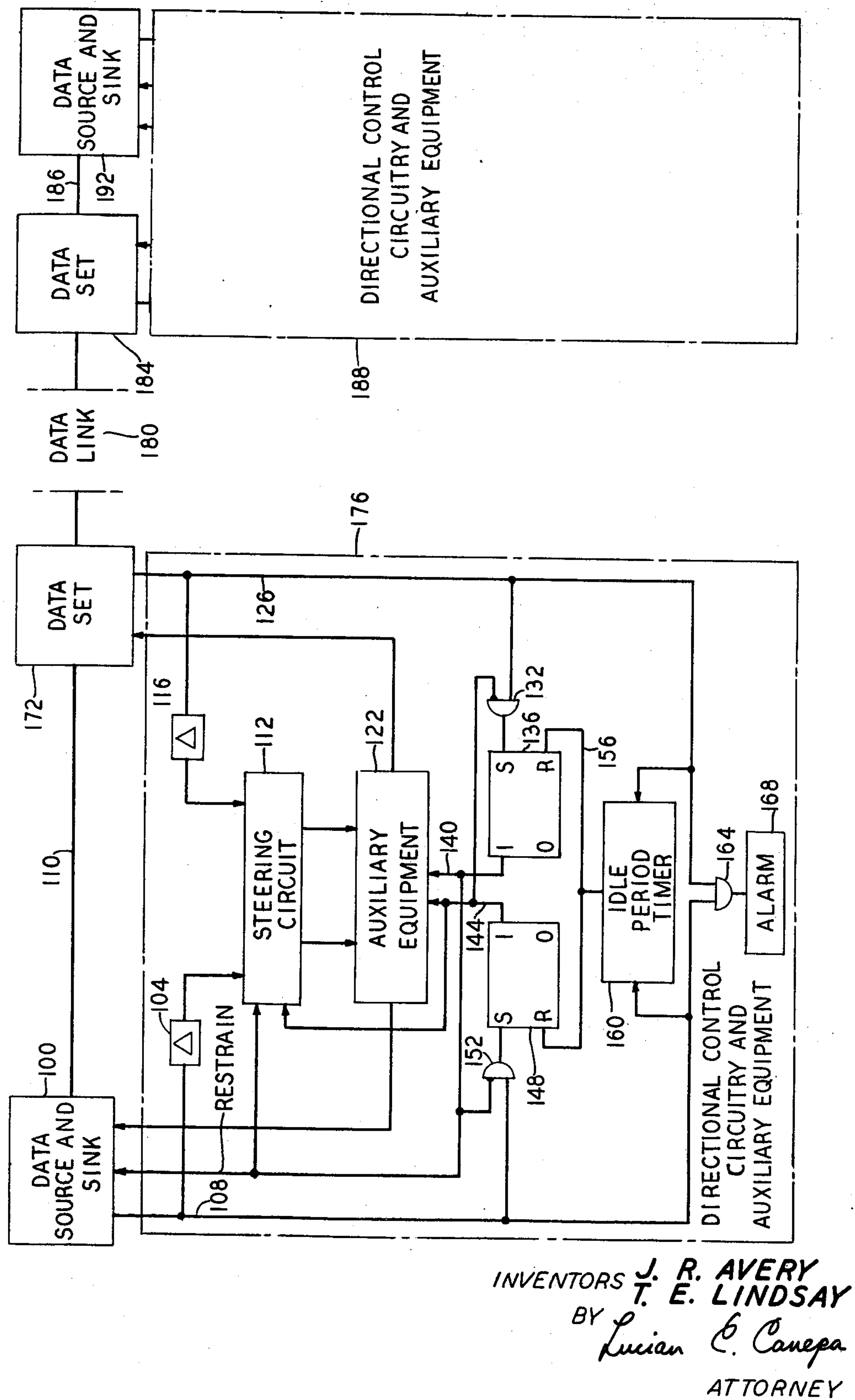
INVENTORS J. R. AVERY
T. E. LINDSAY
BY Lucian E. Canepa
ATTORNEY

3,496,293
AUTOMATIC DIRECTIONAL CONTROL FOR HALF-DUPLEX DATA TRANSMISSION SYSTEMS

John R. Avery, Howell Township, Monmouth County, and Thomas E. Lindsay, Lincroft, N.J., assignors to Bell Telephone Laboratories, Incorporated, Murray Hill and Berkeley Heights, N.J., a corporation of New York Filed July 3, 1967, Ser. No. 650,770
Int. Cl. H04l *5/16*
U.S. Cl. 178—58 10 Claims

ABSTRACT OF THE DISCLOSURE

Automatic directional control apparatus is proposed for use in asynchronous half-duplex data transmission systems. Such apparatus is associated with the data terminals and operates to automatically place terminal auxiliary equipment (for example, error control equipment) in one of three modes—receive, transmit, or idle mode—depending on whether the terminal is to receive or transmit data or simply stand idle awaiting the reception or transmission of data. The directional control apparatus of the first terminal to transmit enables the terminal auxiliary equipment to place it in the transmit mode. The directional control apparatus of the terminal at the other end of the connection places that terminal's auxiliary equipment in the receive mode and applies a restraining signal to the terminal to restrain it from transmitting. If the first terminal stops transmitting for a predetermined period of time, the control apparatus at both terminals causes the auxiliary equipment associated therewith to revert to the idle mode until one of the terminals again initiates transmission.

BACKGROUND OF THE INVENTION

Field of the invention

This invention relates to data transmission systems and more particularly to automatic directional control in half-duplex data transmission systems.

Description of the prior art

In half-duplex data transmission systems, only one data terminal of a two terminal connection may transmit at any one time. If both terminals attempt to transmit at the same time, the transmitted data becomes "garbled." It is, therefore, important in such systems to control which terminal of a connection is to transmit and which terminal is to receive. Such control may be referred to as directional control.

Control of the direction of transmission in half-duplex data transmission systems in current use is generally accomplished by one of two methods. One method consists simply of manually enabling terminal equipment to condition it either for transmission or for reception. (In this connection see, for example, E. Leonard-E. M. Richards-E. Berezin Patent 3,256,514, issued June 14, 1966.) In such systems, if it is desired to change the direction of transmission, the terminal equipment must be manually disabled and re-enabled to transmit in the opposite direction.

A second method of controlling the direction of transmission in prior art systems is by the interchanging of signals between data terminals which signals designate which terminal is to transmit and which terminal is to receive. For example, after one station completes its transmission, it transmits a signal to the other terminal indicating that that terminal may now transmit. This signal is utilized by the station receiving it to enable the equipment of that station necessary to allow transmission. Any subsequent change in the direction of transmission would, of course, be initiated by a further interchange of signals. (See H. Da Silva Patent 3,321,-573 issued May 23, 1967.)

SUMMARY OF THE INVENTION

It is an object of the present invention, in view of the above described prior art systems, to provide automatic directional control apparatus for half-duplex data transmission systems.

It is another object of the present invention to provide automatic directional control apparatus which allows either terminal of a data link connection to automatically initiate the transmission of data.

These and other objects of the present invention are illustrated in a specific system embodiment which includes a plurality of data terminals each, in turn, including certain auxiliary equipments capable of operating in one of three modes—a receive, transmit, or idle mode—and automatic directional control apparatus. After initiation and establishment of a call condition between any two of the data terminals, the auxiliary equipment of each of the data terminals assumes the idle mode. When in this mode either terminal may initiate transmission. The directional control apparatus of the first terminal to transmit enables the terminal auxiliary equipment to place it in the transmit mode. Upon receipt of data by the terminal at the other end of the connection, the directional control apparatus of that terminal places the terminal's auxiliary equipment in the receive mode and restrains the terminal from transmitting. If the first terminal stops transmitting for a predetermined period of time, the control apparatus at both terminals causes the auxiliary equipment associated therewith to revert to the idle mode until one of the terminals again initiates transmission. This arrangement allows the automatic control of the direction of transmission in a half-duplex data transmission system. In addition, either terminal of the data connection may initiate transmission a certain predetermined period of time after cessation of transmission by the other station.

BRIEF DESCRIPTION OF THE DRAWING

A complete understanding of the present invention and of the above and other objects and advantages thereof may be gained from a consideration of the following detailed descreption of a specific illustrative embodiment presented hereinbelow in connection with the accompanying drawing which shows an illustrative embodiment of a data transmission system including automatic directional control circuitry made in accordance with the principles of the present invention.

DETAILED DESCRIPTION

Referring now to the drawing, there is shown a data source and sink 100 connected to directional control circuitry and auxiliary equipment 176 and to a data set 172. The data set 172, in turn, is connected to the directional control circuitry and auxiliary equipment 176 and to a data set 184 via a data link 180. The data set 184 is connected to directional control circuitry and auxiliary equipment 188, which in turn is connected to a data source and sink 192.

The directional control circuitry and auxiliary equipment 176 comprises a steering circuit 112 connected to the data source and sink 100 and the data set 172, auxiliary equipment 122 connected to the data source and sink 100, the data set 172 and the steering circuit 112; two flip-flops 136 and 148 each connected to the auxiliary equipment 122 and the steering circuit 112; an idle period timer 160 connected to the two flip-flops 136 and 148, the data source and sink 100, and the data set 172; and an alarm 168 connected via an AND gate 164 to the data source and sink 100 and the data set 172.

A connection between the data sets 172 and 184 via the data link 180 is established utilizing current state-of-the-art procedures. Such procedures usually involve the interchange of handskaging signals between data terminals to condition the terminals to commence communication. Such a procedure is set forth in T. L. Doktor-G. Parker-L. A. Weber-H. M. Zydney Patent 3,113,176, issued Dec. 3, 1963. The data sources and sinks 100 and 192 might, illustratively, be teletypewriters and operators, computers, etc. The data sets 172 and 184 might illustratively comprise transmission and receiving apparatus such as that disclosed in the above-cited Doktor et al. patent.

While the connection is being established, any signals which must be interchanged between the data source and sink 100 and the data set 172 and between the data source and sink 192 and the data set 184 are applied to a lead 110 and a lead 186, respectively. After completion of the connection, the directional control circuitry and auxiliary equipment 176 and 188 are both in the idle modes awaiting an initiation of transmission by either the data source and sink 100 or the data source and sink 192. (If it were necessary to signal the auxiliary equipments upon completion of the connection, this could be done via a lead from the data set to its associated auxiliary equipment (not shown in drawing).)

Assume that the data source and sink 100 desires to first initiate transmission. The first data character to be transmitted is applied by the data source and sink 100 to a lead 108 and thereby to a delay circuit 104, to an INHIBITED AND gate 152 and to the idle period timer 160. (The INHIBITED AND gate 152 includes one inhibited input and one uninhibited input such that the combination of a "low" signal on the inhibited input and a "high" signal on the uninhibited input causes enablement of the gate.) The applied character in conjunction with the flip-flop 136 residing in the reset state (which causes a "low" signal to be applied to lead 140) operates to enable INHIBITED AND gate 152 and thereby set the flip-flop 148. The data character applied to lead 108 also operates to set the idle period timer 160 to begin timing for some predetermined period of time. The setting of the flip-flop 148 places a "high" condition on lead 144 which enables the auxiliary equipment 122 to place it in a transmit mode and also enables the steering circuit 112 to steer data received from the data source and sink 100 via the delay circuit 104 to the auxiliary equipment 122. Placing the auxiliary equipment 122 in the transmit mode simply involves the enablement of those equipments which are to be utilized when a data source and sink is transmitting. For example, this might comprise the enablement of an encoder for encoding the data received from the data source and sink 100 in some error detection and/or error correction code to thereafter be transmitted to the terminal at the other end of the connection where it would be decoded. In general, the auxiliary equipment 122 might be any equipment necessary to the transmission and/or reception of data.

Placing a "high" condition on lead 144 prevents the enablement of an INHIBITED AND gate 132 even though a signal or noise is received on lead 126. This insures that the auxiliary equipment 122 will be enabled to occupy but one mode at a time, either the transmit mode or a receive mode (the latter will be discussed hereafter).

After the appropriate auxiliary equipment 122 and the steering circuit 112 are enabled, the data character applied by the data source and sink 100 to the lead 108 emerges from the delay circuit 104 and is passed via the steering circuit 112 to the appropriate auxiliary equipment 122. (It was, of course, necessary to delay the character to allow enablement of the appropriate equipment.) The data character is then applied to the data set 172 from which it is transmitted via the data link 180 to the data set 184. If the data source and sink 100 applies no more data characters to the lead 108 at this time, then the idle period timer 160 times for a predetermined period of time and, upon the occurrence of a time-out, applies a signal to a lead 156. This signal operates to reset the flip-flop 148 and thereby remove the "high" condition from the lead 144. This causes disablement of the steering circuit 112 and causes the auxiliary equipment 122 to revert to the idle mode. On the other hand, if the data source and sink 100 applies a data character to the lead 108 before the idle period timer 160 times out, then this data character operates to reset the idle period timer 160 to begin timing over the predetermined interval again. Likewise, each time a data character is applied to the lead 108, the idle period timer 160 is reset.

In order to explain the operation of the directional control circuitry at a receiving terminal, assume that the data set 172 has just received a data character via the data link 180 from the data set 184. Upon receipt of this character, the data set 172 applies the character to a lead 126 which, in conjunction with the flip-flop 148 being in the reset condition (and thus a "low" condition being applied to lead 144), operates to enable the INHIBITED AND gate 132 thereby setting the flip-flop 136. The character applied to the lead 126 also sets the idle period timer 160 to begin timing over some predetermined period of time. Setting the flip-flop 136 causes a "high" condition to be placed on a lead 140 which enables the auxiliary equipment 122, placing it in the receive mode, and enables the steering circuit 112 to steer data characters received from the data set 172 via the delay circuit 116 to the appropriate auxiliary equipment. Placing the auxiliary equipment 122 in the receive mode may, for example, entail the enablement of a decoder for detecting and/or correcting data characters received via the data set 172 from the transmitting terminal.

The "high" condition on lead 140 also acts to restrain or inhibit the data source and sink 100 from initiating transmission of data. Lastly, the "high" condition prevents the enablement of the INHIBITED AND gate 152 in case a signal or noise is applied, by mistake, to the lead 108. As before, this prevents the auxiliary equipment 122 and the steering circuit 112 from occupying more than a single mode at any one time.

If the data set 172 does not receive an additional data character during the period of time over which the idle period timer 160 is timing, the timer times out and thereby applies a signal to the lead 156, resetting the flip-flop 136. This, in turn, results in the removal of the "high" condition from the lead 140 causing the steering circuit 112 to be disabled and the auxiliary equipment 122 to revert to the idle mode. When in the idle mode, of course, either data terminal may initiate transmission. If, however, another data character is received by the data set 172 and applied to the lead 126, the idle period timer 160 resets and again begins timing over the predetermined interval.

If the data source and sink 100 desires to initiate transmission of data and in doing so applies a data character to the lead 108 at the same time that the data set 172 is applying a received data character to the lead 126, an AND gate 164 is enabled to activate an alarm 168. The alarm 168 may emit some type of signal (e.g., audible or visual) to alert an attendant to the condition. The attendant could then, for example, manually restrain the data source and sink 100 from transmitting characters.

It is noted that detailed circuit configurations for the units 104, 112, 116, 160, and 168 shown in the drawing have not been given herein because their arrangements are considered to be clearly within the skill of the art. Exemplary implementations for the units 100, 122, 172, 184, and 192 have already been given hereinabove.

Finally, it is to be understood that the above described arrangement is only illustrative of the applications of the principles of the present invention. Numerous other arrangements may be devised by those skilled in the art without departing from the spirit and scope of the invention. For example, if the auxiliary equipment 122 of FIG. 1 included error detection and retransmission equipment, then the steering circuit 112 would be arranged to steer special retransmission request signals received by the data set 172 from the receiving terminal to appropriate auxiliary equipment 122. In response to this retransmission request signal, the auxiliary equipment 122 would apply a restraining signal to the data source and sink 100 and would then retransmit a certain number of the data characters previously transmitted (which characters would, of course, have had to have been stored by the auxiliary equipment). In addition, the directional control circuitry could be arranged to respond to other special type signals received from the receiving terminal to restrain the transmitting data source and sink from transmitting any further data characters.

What is claimed is:

1. A data transmission system including a two-way transmission channel interconnecting data terminals wherein each of said terminals comprises a source of data signals, transmission and receiving means, auxiliary equipment connected to said data source and said transmission and receiving means for operating on data from said source when in a transmit mode and on data from said transmission and receiving means when in a receive mode and capable of assuming an idle mode after having operated in either the transmit or receive mode, means responsive to said data source initiating transmission of data for automatically activating said auxiliary equipment to said transmit mode, means responsive to said transmission and receiving means receiving data from said transmission channel for automatically activating said auxiliary equipment to said receive mode, and means connected to said data source and said transmission and receiving means for deactivating said auxiliary equipment to said idle mode upon lapse of a certain predetermined period of time from either the last transmission or the last reception of data.

2. A system as in claim 1 further comprising steering means responsive to said transmit mode activating means for transferring data signals from said source to said auxiliary equipment and responsive to said receive mode activating means for transferring data signals received by said transmission and receiving means to said auxiliary equipment.

3. A system as in claim 2 further comprising means responsive to said transmit mode activating means for preventing said receive mode activating means from activating said auxiliary equipment upon receipt of data from said transmission channel when said auxiliary equipment is in said transmit mode, and means responsive to said receive mode activating means for preventing said transmit mode activating means from activating said auxiliary equipment upon initiation of transmission of data by said data source when said auxiliary equipment is in said receive mode.

4. A system as in claim 3 further comprising an alarm signal generating means connected to said data source and said transmission and receiving means and responsive to the simultaneous occurrence of an initiation of transmission by said data source and a reception of data from said transmission channel.

5. A half-duplex data transmission system including a plurality of data terminals and means for interconnecting said terminals, each of said terminals comprising a data source, transmission and receiving means, auxiliary equipment connected to said source and said transmission and receiving means, a first portion of said equipment being utilized to operate on data to be transmitted and a second portion of said equipment being utilized to operate on received data, first means resosive to said data source initiating the transmission of data for automatically activating the first portion of said auxiliary equipment to operate on the data transmitted, and second means responsive to said transmission and receiving means receiving data from said interconnecting means for automatically activating the second portion of said auxiliary equipment to operate on the received data.

6. A system as in claim 5 further comprising a timing means connected to said data source and said transmission and receiving means for causing said first and second means to deactivate said auxiliary equipment upon lapse of a certain predetermined period of time from either the last transmission or the last reception of data.

7. A system as in claim 6 further comprising a steering means responsive to said first means for transferring data signals from said data source to the first portion of said auxiliary equipment and responsive to said second means for transferring data signals received by said transmission and receiving means to the second portion of said auxiliary equipment.

8. A system as in claim 7 further comprising means responsive to said first means for preventing said second means from activating the second portion of said auxiliary equipment when the first portion of said auxiliary equipment is activated, and means responsive to said second means for preventing said first means from activating the first portion of said auxiliary equipment when the second portion of said auxiliary equipment is activated.

9. A system as in claim 8 further comprising an alarm signal generating means connected to said data source and said transmission and receiving means and responsive to the simultaneous occurrence of an initiation of transmission by said data source and reception of data from said interconnecting means.

10. A half-duplex data transmission system including a plurality of data terminals and means for interconnecting said terminals, each of said terminals comprising a source of data signals, transmission and receiving means, auxiliary equipment connected to said data source and said transmission and receiving means and operable in a first mode to process data signals to be transmitted and in a second mode to process received data signals, first means responsive to said data source initiating transmission of data for automatically activating said auxiliary equipment to said first mode, second means responsive to said transmission and receiving means upon receipt of data from said transmission channel for automatically activating said auxiliary equipment to said second mode and for appling an inhibiting signal to said data source to prevent said data source from initiating transmission, and means connected to said data source and said transmission and receiving means for causing the activation of said auxiliary equipment and the removal of said inhibiting signal upon lapse of a certain predetermined period of time from either the last transmission or the last reception of data.

References Cited

UNITED STATES PATENTS

| | | | |
|---|---|---|---|
| 2,404,356 | 7/1946 | Atkins | 178—58 |
| 2,478,409 | 8/1949 | Loughlin | 340—346 |
| 2,742,526 | 4/1956 | Ridings | 178—4.1 |
| 2,912,485 | 11/1959 | Kaufman et al. | 178—4.1 |
| 3,404,219 | 10/1968 | Couturier | 178—58 |
| 3,420,948 | 1/1969 | Arko | 178—4.1 |

THOMAS A. ROBINSON, Primary Examiner

U.S. Cl. X.R.

178—4.1; 325—57; 340—147, 346